United States Patent [19]

Bareth

[11] 3,758,948

[45] Sept. 18, 1973

[54] STRAIGHT OR ANGLE DENTAL HANDPIECE

[75] Inventor: Erich Bareth, Ummendorf, Germany

[73] Assignee: Kaltenbach & Voight, Biberach/Riss Bismarckring, Germany

[22] Filed: Mar. 17, 1972

[21] Appl. No.: 235,521

[30] Foreign Application Priority Data

April 2, 1971 Germany............ P 21 16 182.0

[52] U.S. Cl. .................................... 32/26, 32/27
[51] Int. Cl. ............................................ A61c 19/02
[58] Field of Search ................................. 32/26, 27

[56] References Cited
UNITED STATES PATENTS 2,679,101   5/1934   Steurer et al. .................... 32/27
3,418,715  12/1968   Ellis ................................. 32/26

Primary Examiner—Robert Peshock
Attorney—Eric H. Waters et al.

[57] ABSTRACT

A dental handpiece adapted for having a tool inserted into a rotationally drivable hollow shaft mounted in the nose of a straight handpiece or a head of an angle handpiece. At the end of the hollow shaft there is a radial annular flange which covers an annular bearing gap between the housing and the shaft at the end from which the tool projects. The annular flange abuts against a sealing ring which bears against the housing, and the sealing ring is completely covered by the annular flange. Between the sealing ring and the housing there is mounted a compression spring acting in the axial direction of the shaft.

12 Claims, 4 Drawing Figures

3,758,948

STRAIGHT OR ANGLE DENTAL HANDPIECE

BACKGROUND

1. Field of the Invention

The invention relates to a dental handpiece which may be straight or angled and which is adapted to have a tool inserted in a rotatably driven hollow shaft so as to be fast in rotation therewith.

2. Prior Art

In known handpieces of the above type, there is mounted at the end of the hollow shaft, a radial annular flange which covers an annular bearing gap at the end of the shaft where the tool issues from the shaft. The flange rotates with the hollow shaft and abuts against a sealing ring bearing on a non-rotating part of the housing of the handpiece in a direction parallel to the axis of rotation of the hollow shaft.

In an angle handpiece of this kind, the non-rotating sealing ring becomes worn very quickly since it is subjected to considerable abrasion by the surface of the rapidly rotating annular flange. After wear has occurred there is formed an open annular gap leading into the interior of the handpiece, through which impurities such as drilling particles, polishing dust, spray water, material abraded from tools, tooth material in powder form or the like can enter into the interior of the handpiece. These impurities accumulate on the bearing or driving parts, thus disturbing the operation of the handpiece and causing considerable wear on the bearing and driving parts.

SUMMARY OF THE INVENTION

An object of the invention is to provide a dental handpiece of the above type wherein abrasion of the sealing ring will not cause any detrimental results of the type already mentioned, and wherein the sealing effect is maintained without failure.

To solve this problem, it is proposed according to the invention that the sealing ring be completely covered by the annular flange and laterally abut against the internal wall of a non-rotating cylindrical portion of the housing of the handpiece whereas between the sealing ring and the non-rotating part of the housing there is used a compression spring for supporting the ring in a direction parallel to the axis of the hollow shaft acting in the aforesaid direction.

The compression spring according to the invention serves the purpose of permanently pressing the ring in the axial direction towards the annular flange to continue to obtain its sealing effect. Due to the fact that the sealing ring is completely masked by the annular flange, the effects of the wear which occurs in the known handpiece between the sealing ring and the annular flange are avoided.

The compression spring is conveniently constructed as an annular spring.

A still better pressure distribution on the sealing ring is obtained if the compression spring is formed of an annular corrugated spring.

It is also possible for the compression spring to be constructed as a helical spring.

Pressure distribution from the compression spring to the sealing ring is effected most advantageously if there is arranged between the compression spring and the sealing ring an intermediate ring which is made of a more rigid material than the sealing ring. If, for example, the sealing ring is made of a plastic material such as Teflon, it is preferred to make the intermediate ring of metal.

In an expedient constructional form, the ring in cross-section in widening fashion tapers from the annular flange towards the compression spring. Preferably, the rate of taper is greater from the flange to an intermediate location in the ring as compared from the intermediate location towards the compression spring. This constructional form is particularly advantageous if an intermediate ring is arranged between the compression spring and the sealing ring, since in such case the sealing ring then abuts with a greater pressure per unit of surface area against the annular flange than at the opposite side, and therefore an extremely reliable seal is guaranteed. Apart from this, it is found that a relatively small sealing surface gives a better seal than a large sealing surface.

In order that a desired preload can be provided at the compression spring at the time of assembly, it is advantageous if the annular flange is provided with a sleeve which extends from its inner edge at right angles to the annular flange and is mounted on the hollow shaft in such a manner as to be fast in rotation therewith. The hollow shaft is preferably reduced in diameter at its outer surface in the region of the sleeve and there is formed at the end of the reduced-diameter portion a shoulder which serves as an abutment so that preload can always be applied to the compression spring, the sleeve being pushed on the shaft as far as the aforesaid abutment.

In a particularly advantageous constructional form, the sleeve is screwed onto the hollow shaft. Hence, if the sealing ring is completely worn, it is only necessary to unscrew the annular flange and sleeve from the hollow shaft, whereby the annular flange and sleeve, sealing ring, compression spring, and intermediate ring if provided, can be removed as a unit. Then in a simple manner a new sealing ring can be fitted onto the sleeve in abutment with the annular flange, whereupon the intermediate ring and compression spring are fitted onto the sleeve. The dentist can in actual practice screw the annular flange and sleeve member back onto the handpiece, the end of the screwthread forming an abutment for producing a predetermined preload for the compression spring.

DETAILED DESCRIPTION

Figure 3:
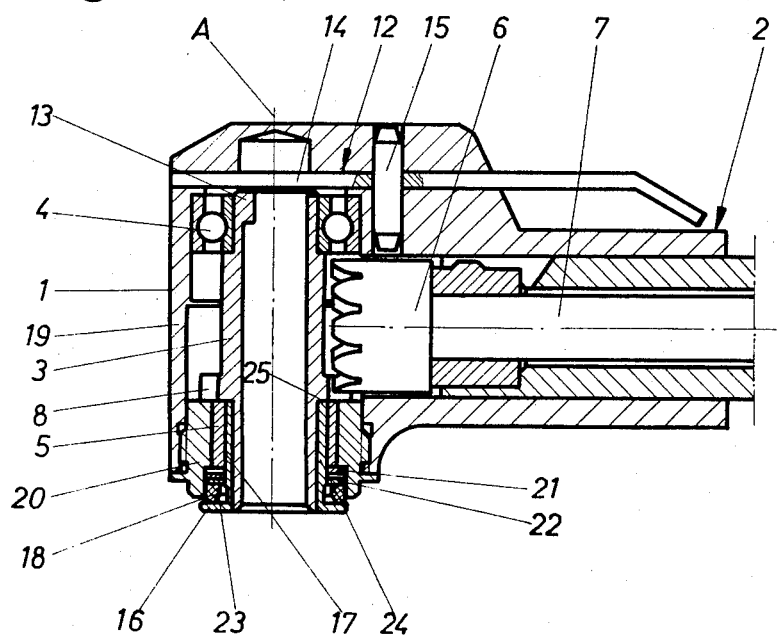
FIG. 3 is a cross-section taken through the head of an angle handpiece.

Referring to the drawing, and particularly to FIG. 3, a hollow shaft 3 is rotatably mounted in the head 1 of a dental angle handpiece 2 and is adapted for being driven in rotation. The rotatable support of shaft 3 is provided by a ball bearing 4 at the upper end of shaft 3 in the angle handpiece head 1 and a plain bearing 5 at the lower end. Of course, it is possible for both bearings to be constituted by ball bearings or by plain bearings. If the hollow shaft 3 is constructed as a turbine rotor it is also possible to have an air bearing arrangement for the hollow shaft.

According to FIG. 3, the hollow shaft 3 is driven in rotation by a driving gearwheel 6 mounted on a driving shaft 7 mounted in the angle handpiece 2, the teeth of the gearwheel 6 engaging teeth 8 of the hollow shaft in driving relation.

Figure 1:
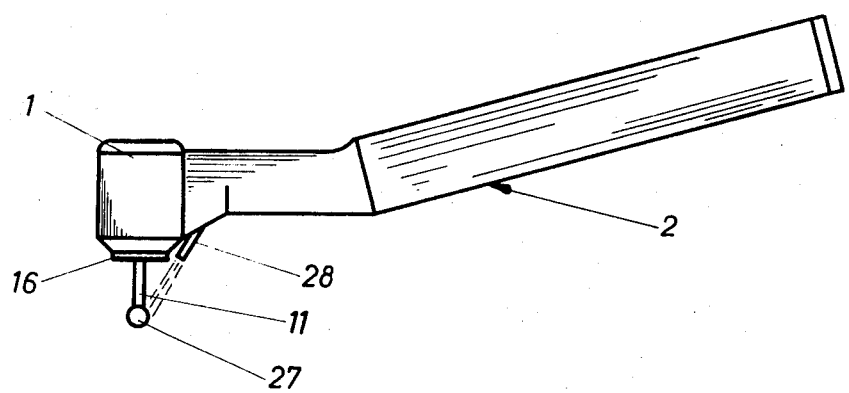
FIG. 1 is a side elevational view of a dental angle handpiece.
Figure 2:
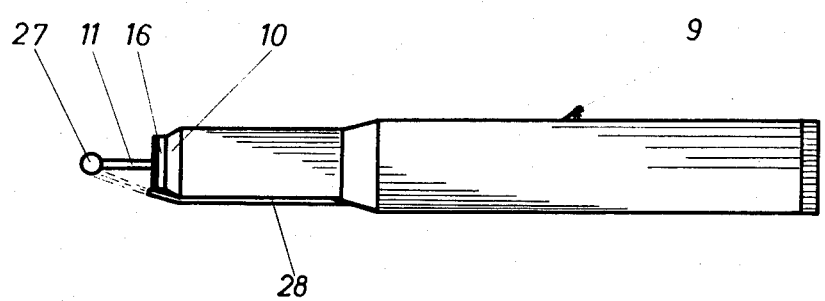
FIG. 2 is a side elevational view of a dental straight handpiece.

In the straight handpiece 9 shown in FIG. 2, the driving of the hollow shaft situated in the handpiece nose 10 is effected in known manner, of course without the need for a driving tooth system engaging at right angles.

The shank of a tool 11 is adapted to be inserted in the hollow shaft 3 so as to be fast in rotation therewith. This can be effected in a suitable manner either by means of a known collet chuck or, as shown in FIG. 3, by a locking device 12, the rotationally integral connection being formed of an entrainment nose or key 13 which projects inwards and engages in a corresponding recess of the tool shank. The tool is retained in axial position by means of a retaining catch 14 which is pivotable horizontally about a pivot 15 and is adapted to engage in an annular groove of the shank of the tool.

At the lower end of the hollow shaft 3 there is an annular flange 16 which rotates with the shaft. The annular flange 16 covers an annular bearing gap 17 of the hollow shaft 3 at the lower end of the hollow shaft 3 from which the tool 11 projects. The side of the annular flange 16 nearest to the bearing 5 abuts against a sealing ring 18, which bears indirectly on a non-rotating part 19 of the housing, in the case of FIG. 3 on the lower end face of the ring 18 in a direction parallel to axis A of the hollow shaft 3.

Figure 4:
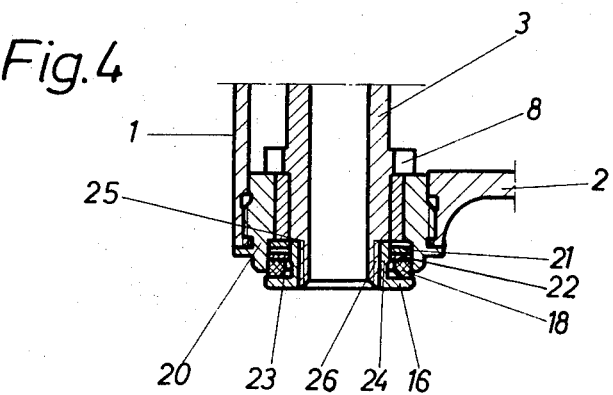
FIG. 4 is a sectional view of the tool-region end of the head of a dental angle handpiece showing a modified constructional form as compared to FIG. 3.

As seen in FIGS. 3 and 4, the sealing ring 18 is completely masked by the annular flange 16. The sealing ring 18 abuts laterally against the internal wall of a non-rotating cylindrical part 20 of the housing portion part 19. Between the sealing ring 18 and the non-rotating bearing 5 which serves to support the said sealing ring in a direction parallel to the axis A, there is mounted a compression spring 21 which also acts parallel to the direction of the axis A. The compression spring 21 is constructed as an annular corrugated spring. The spring 21 may also be constructed as an annular spring or a helical spring. Between the compression spring 21 and the sealing ring 18 there is provided an intermediate ring 22 which is composed of a more rigid material than the sealing ring 18.

In cross-section, the control central bore of the sealing ring 18 is tapered in narrowing fashion from the annular flange 16 to an intermediate bevel 23 beyond which the bore continues to narrow at a much reduced rate towards the compression spring 21. Thereby, a smaller bearing surface is provided between ring 18 and flange 16 as compared to the bearing surface between ring 18 and intermediate member 22.

The annular flange 16 is provided with a sleeve 24 which extends from its inner edge inwardly into the housing portion 19 at right angles to flange 16, the sleeve 24 being fast in rotation on the hollow shaft 3. The hollow shaft is reduced in thickness in the region of the sleeve 24 so that the end 25 of the reduced portion forms a shoulder abutment for the sleeve 24 when the latter is placed on the hollow shaft 3.

As seen in FIG. 4, the sleeve 24 of the annular flange 16 may be screwed onto the hollow shaft 3 to obtain the common rotation thereof. The screwthread used for this purpose is designated by numeral 26.

The illustrated arrangement of the compression spring 21 has the result that the non-rotating sealing ring 18, abutting against the rotating annular flange 16, remains permanently effective even when abrasion occurs, so that impurities such as grinding dust produced by the drill bit 27 of the tool 11, or water splashes or the like caused by the spray jet issuing from the nozzle 28 and impinging on the bit 27 cannot enter into the interior of the angle handpiece 2 or the straight handpiece 9 even when the sealing ring 18 becomes worn.

Although the cross-sectional shape of the ring 18 as described is advantageous as regards pressure distribution between the ring and flange 16 and spring 21, the sealing ring 18 can also have a round or uniformly angular cross-section.

What is claimed is:

1. A dental handpiece comprising a housing, a hollow shaft rotatably mounted in said housing and adapted for receiving a tool which can be fixed in rotation therewith for operative projection beyond the housing, means in said housing for rotating said shaft about an axis of rotation, bearing means in said housing between the shaft and housing, said shaft and housing defining an annular gap therebetween in the region of the housing from which the tool projects, said gap extending to the bearing means, an annular flange secured to said shaft for rotation therewith and covering said gap from the outside, a sealing ring in said gap covered by said flange, said sealing ring bearing against said housing and abutting against said annular flange with a force parallel to the axis of rotation of the shaft, and compression spring means interposed in said gap between the sealing ring and said housing for producing pressure force in a direction parallel to the axis of rotation of the shaft to cause said sealing ring to bear against said flange.

2. A dental handpiece as claimed in claim 1 wherein said sealing ring has an outer surface which is in lateral abutment with said housing along an inner surface of the latter.

3. A dental handpiece as claimed in claim 1 wherein said compression spring means comprises an annular spring.

4. A dental handpiece as claimed in claim 1 wherein said compression spring means comprises a corrugated spring.

5. A dental handpiece as claimed in claim 1 wherein said compression spring means comprises a helical spring.

6. A dental handpiece as claimed in claim 1 comprising an intermediate ring between the compression spring means and the sealing ring, said intermediate ring being made of a more rigid material than the sealing ring.

7. A dental handpiece as claimed in claim 1 wherein said sealing ring has a tapered cross-section which widens in the direction from the annular flange towards the compression spring means.

8. A dental handpiece as claimed in claim 7 wherein the tapered cross-section widens at a greater rate from the annular flange to an intermediate location as compared to the taper towards the spring means.

9. A dental handpiece as claimed in claim 1 comprising an axial sleeve secured to said flange, said sleeve being secured to said shaft for rotation therewith.

10. A dental handpiece as claimed in claim 9 wherein said hollow shaft includes a portion of reduced diameter in which said sleeve is seated, said portion of reduced diameter defining an abutment shoulder at one end thereof for contact by said sleeve.

11. A dental handpiece as claimed in claim 9 wherein said sleeve and shaft are provided with threads so as to be threadably engaged.

12. A dental handpiece as claimed in claim 1 wherein said bearing means faces into said gap.

* * * * *